United States Patent
Wong et al.

(10) Patent No.: US 9,674,236 B2
(45) Date of Patent: Jun. 6, 2017

(54) METHOD FOR SYNCRONIZED REAL-TIME SHARING THE DISPLAY OF ORDERED LISTS OF CONTENT

(71) Applicant: Samsung Electronics Co., Ltd., Suwon-si, Gyeonggi-do (KR)

(72) Inventors: Benny Wong, San Francisco, CA (US); Bing Xia, Palo Alto, CA (US); Eui-Suk Chung, Cupertino, CA (US); Peter King, San Mateo, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 542 days.

(21) Appl. No.: 14/104,385

(22) Filed: Dec. 12, 2013

(65) Prior Publication Data

US 2015/0172329 A1 Jun. 18, 2015

(51) Int. Cl.
| | |
|---|---|
| G06F 3/048 | (2013.01) |
| H04L 29/06 | (2006.01) |
| H04L 29/08 | (2006.01) |
| G06F 3/0482 | (2013.01) |
| G06F 3/0485 | (2013.01) |

(52) U.S. Cl.
CPC .......... *H04L 65/403* (2013.01); *G06F 3/0482* (2013.01); *G06F 3/0485* (2013.01); *H04L 67/04* (2013.01); *H04L 67/1095* (2013.01); *H04L 67/26* (2013.01); *H04L 67/303* (2013.01)

(58) Field of Classification Search
CPC .................................................. H04L 67/303
USPC ........................................ 715/751, 753, 760
See application file for complete search history.

(56) References Cited

U.S. PATENT DOCUMENTS

| | | | | | |
|---|---|---|---|---|---|
| 5,899,995 | A | * | 5/1999 | Millier | ............. G06F 17/30011 |
| 6,654,784 | B1 | * | 11/2003 | Wei | ......................... H04L 29/06 |
| | | | | | 709/203 |
| 7,398,295 | B2 | * | 7/2008 | Shoroff | .............. H04L 12/1813 |
| | | | | | 709/204 |
| 8,471,782 | B2 | * | 6/2013 | Muklashy | ............ G06F 3/1423 |
| | | | | | 345/1.1 |
| 9,251,506 | B2 | * | 2/2016 | Benjamin | ........... G06Q 10/107 |
| 2002/0111995 | A1 | * | 8/2002 | Mansour | .............. G06F 9/4445 |
| | | | | | 709/203 |

(Continued)

FOREIGN PATENT DOCUMENTS

| | | |
|---|---|---|
| EP | 1 853 019 A1 | 11/2007 |
| WO | 02/089010 A1 | 11/2002 |

(Continued)

*Primary Examiner* — David Phantana Angkool
(74) *Attorney, Agent, or Firm* — Jefferson IP Law, LLP (57) ABSTRACT

An apparatus and method for synchronizing the display of content in a real-time collaboration system are provided. The method includes transmitting, from a master device to each of a plurality of other devices, a list of thumbnails and content corresponding to each thumbnail, for each of the plurality of other devices, displaying the list of thumbnails in a format appropriate for that device, without taking into account a display format of other devices in the plurality of other devices, transmitting, from the master device to each of the plurality of other devices, a content ID corresponding to content having a current focus, and for each of the plurality of devices, scrolling through the list of thumbnails to display the thumbnail corresponding to the received content ID.

13 Claims, 4 Drawing Sheets

(56) References Cited

U.S. PATENT DOCUMENTS

2006/0284785 A1* 12/2006 Bitterlich .............. G06F 3/0486
                                                         345/1.1
2007/0027960 A1*  2/2007 De Leon ........... H04L 29/06027
                                                         709/217
2010/0085317 A1*  4/2010 Park ...................... G06F 1/1626
                                                         345/173

FOREIGN PATENT DOCUMENTS

WO       2007/118424  A1     10/2007
WO    WO 2007118424  A1 *   10/2007   ....... G06F 17/30905

* cited by examiner

METHOD FOR SYNCRONIZED REAL-TIME SHARING THE DISPLAY OF ORDERED LISTS OF CONTENT

TECHNICAL FIELD

The present disclosure relates to a method for synchronized real-time sharing. More particularly, the present disclosure relates to a method for synchronized real-time sharing the display of ordered lists of content across devices having different display sizes and scrolling orientations.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

With the rise of mobile terminals has come the rise of real-time collaboration. This allows multiple people to view and collaborate using their own devices. Through real-time collaboration, users across the globe can work together on the same content using a variety of devices.

However, current solutions do not effectively address synchronization of content display. For example, when a list of content is being displayed as part of a real-time collaboration, current solutions do not allow each device to handle scrolling the list according to each device's scheme or in a format suitable for each device's display resolution. Instead, in one solution according to the related art, a leader (or master) device transmits a current view of the master device (e.g., a viewport) to each of the other devices, which then reproduce the view on the master device, even if that view is not suitable for the receiving device (for example, because the master device has a larger display resolution). In another solution, no information about the view is transmitted, leaving each individual user to scroll through the content list to focus on the item selected by the leaser. At present, there is no way to allow each device to display and scroll the list of content items in a manner suited to each device, or to allow the master device to transmit a single command that affects each device's display in a different manner.

SUMMARY

Aspects of the present disclosure are to address at least the above-mentioned problems and/or disadvantages and to provide at least the advantages described below. Accordingly, an aspect of the present disclosure is to provide a method for synchronized real-time sharing of the display of ordered lists of content items across deices having differing displays and scrolling orientation.

In accordance with an aspect of the present disclosure, a method for synchronizing the display of content in a real-time collaboration system is provided. The method includes transmitting, from a master device to each of a plurality of other devices, a list of thumbnails and content corresponding to each thumbnail, for each of the plurality of other devices, displaying the list of thumbnails in a format appropriate for that device, without taking into account a display format of other devices in the plurality of other devices, transmitting, from the master device to each of the plurality of other devices, a content ID corresponding to content having a current focus, and for each of the plurality of devices, scrolling through the list of thumbnails to display the thumbnail corresponding to the received content ID.

In accordance with another aspect of the present invention, a real-time collaborative system is provided. The system includes a master device and a plurality of other devices. The master device is configured to transmit, to each of the plurality of other devices, a thumbnail list and content corresponding to each thumbnail in the thumbnail list, and to transmit, when a change in focus occurs, a content ID corresponding to a thumbnail to which the focus has changed. Each of the plurality of other devices is configured to display the list of thumbnails in a format for that device, without taking into account a display format of other devices, and wherein, when the content ID is received, to display the thumbnail corresponding to the content ID without taking into account the display format of the other devices.

In accordance with another aspect of the present invention, a method of displaying content in a real-time collaborative system is provided. The method includes receiving, at a device, a list of thumbnails and content corresponding to each thumbnail in the list of thumbnails, displaying the list of thumbnails without taking into account a display format of other devices in the real-time collaborative system, receiving a content ID from a master device corresponding to a thumbnail to which a focus is to be changed, and displaying a focus on the thumbnail corresponding to the content ID, without taking into account a display format of the other devices in the real-time collaborative system.

In accordance with another aspect of the present invention, an apparatus for real-time collaboration is provided. The apparatus includes a communication unit configured to receive a list of thumbnails, content corresponding to each thumbnail, and a content ID corresponding to a thumbnail to which a focus is to be changed, a display unit, and a controller configured to control the display unit to display the list of thumbnails on the display unit, and, when the content ID is received, to control the display unit to display a focus on the thumbnail corresponding to the content ID according to a display format of the device, without taking into account a display format of other devices participating in the real-time collaboration.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
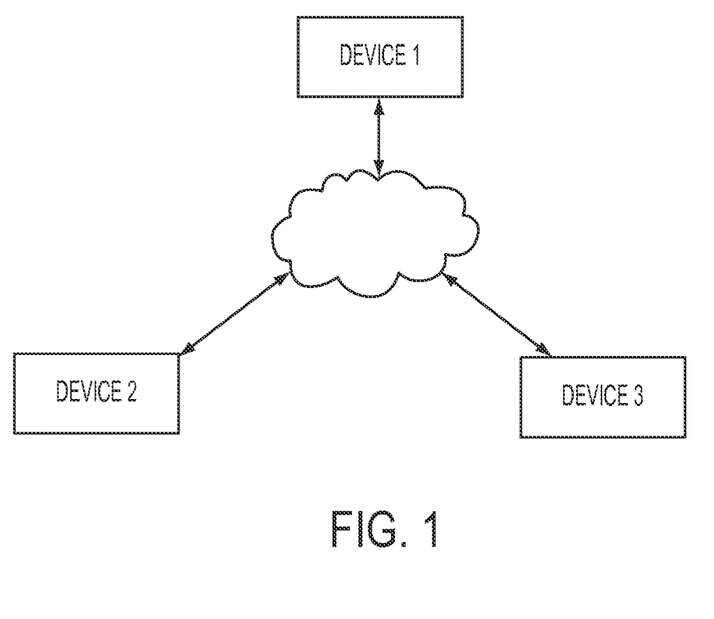
FIG. 1 illustrates a real-time collaboration system according to an embodiment of the present disclosure.

FIG. 1 illustrates a real-time collaboration system according to an exemplary embodiment of the present disclosure.

Referring to FIG. 1, the system includes a number of devices engaging in real-time collaboration. Although the system may include any number of devices, for purposes of explanation, the system shown in FIG. 1 includes three devices: device 1, device 2, and device 3. The devices engage in real-time collaboration and document sharing over a network, such as the Internet or a Local Area Network (LAN). The three devices may engage in the real-time collaboration via a cloud-based service, a dedicated server (or server application), direct peer-to-peer communication, or the like, as represented by the cloud in FIG. 1.

In the real-time collaboration, the devices share a list of content that is being used in the real-time collaboration. In the present disclosure, the list of content items is referred to as a "thumbnail list", but this is not intended to be limiting. The content included in the thumbnail list may be any type of content, including slides, images, text, video, and the like, and may include content having a Multipurpose Internet Mail Extension (MIME) type, or other atomic format. The content included in the thumbnail list need not all have the same type; the thumbnail list may include thumbnails for video, text, slides, audio, and the like.

The thumbnail list may include a reduced-size image or icon corresponding to the content, a textual description of the content, or a combination thereof. For example, an audio clip may have a thumbnail that includes an icon indicating an audio clip along with a brief description of the clip. Each device may display the thumbnail list in a format suitable for that device, and may take into account various factors, such as a display size or a screen resolution, when displaying the thumbnail list. As a result, each device may display the thumbnail list differently from the others.

Typically, one of the devices is designated as a leader, or master device. The master device takes the lead in the real-time collaboration. The master device transmits a list of the thumbnails and the corresponding content to the other devices. These other devices render the list in whatever format is most appropriate for that device. A device having a large display or screen resolution may render all of the thumbnails on a single screen, while devices having smaller screens may render a subset of the list on a single screen, and scroll the list in a horizontal (left to right) or vertical (top to bottom) direction.

When the master device changes the focus from one thumbnail to another, the master devices transmits an ID for the newly focused thumbnail to each of the other devices. The other devices scroll to the thumbnail corresponding to the received content ID, according to a scheme for each device. As a result, the devices maintain synchronicity of display while still displaying the content in a manner best suited for each display. This improves the experience of the participants in the real-time collaboration; users employing smaller screens do not, for example, view a down-sized version of a screen intended to be used on a large monitor.

Figure 2A:
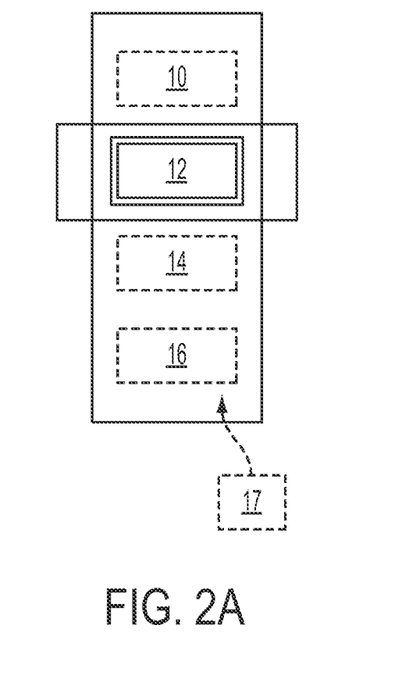
FIGS. 2A and 2B illustrate different scrolling and display schemes according to an embodiment of the present disclosure.
Figure 2B:
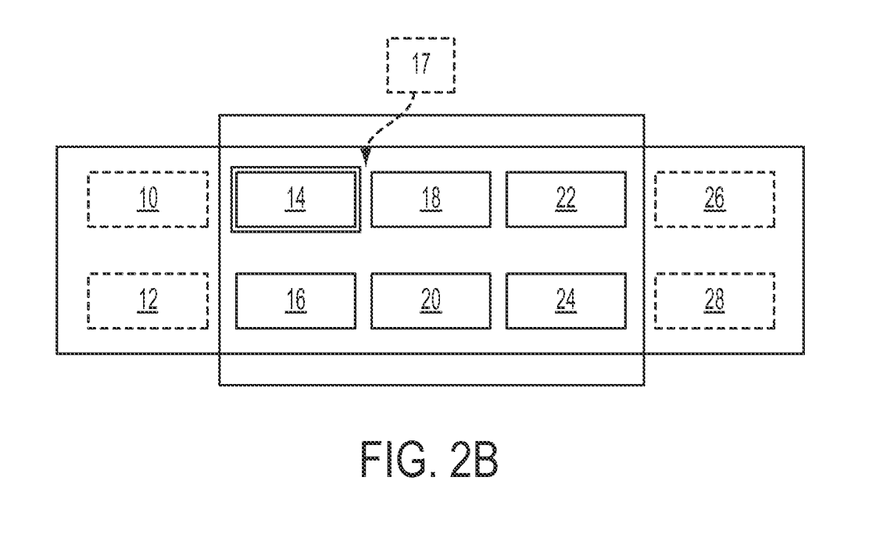

FIGS. 2A and 2B illustrate different scrolling and display schemes for thumbnail lists according to an embodiment of the present disclosure.

Referring to FIGS. 2A and 2B, different devices may show a thumbnail list in different formats. A tablet-sized display might display the thumbnail list in a vertical orientation in which each thumbnail takes up the entire screen, as shown in FIG. 2A. In FIG. 2A, the thumbnail 12 is the currently focused thumbnail, and takes up the entire screen. If the device subsequently receives a content ID corresponding to thumbnail 16, the device determines that thumbnail 16 now has the focus, and scrolls down the list to show thumbnail 16. This may be accompanied by a scrolling animation.

However, other devices having different display or scrolling schemes would not show the same behavior. FIG. 2B illustrates another format for displaying the thumbnail list. In the format shown in FIG. 2B, the thumbnails are arranged in a horizontal grid, with each screen showing six thumbnails. Thumbnail 14 currently has the focus. If the device showing the display of FIG. 2B receives a content ID corresponding to the thumbnail 16, the display will not scroll, as thumbnail 16 is already visible. If another content ID corresponding to thumbnail 26 is received, the display will scroll to the right to show thumbnail 26.

In FIGS. 2A and 2B, the thumbnail having the focus is displayed as having a thicker border as compared to the thumbnail not having the focus. This mechanism for displaying the focus may be applied to the displays, or a display may show the focus in another format, such as with an icon.

During the course of the collaboration, thumbnail items may be added to or removed from the thumbnail list. In the case of deleting a thumbnail, the master device may transmit a content ID corresponding to a thumbnail to be deleted, at which point the other devices update their list, and, if necessary, update the display as well. For example, if the master device transmits an instruction to delete the thumbnail 16, the table of FIG. 2A may delete the thumbnail 16 without updating the display, while the mobile device of FIG. 2B may update the display to indicate that the thumbnail 16 has been deleted. The updating may be accomplished with, for example, an animation effect in which the thumbnail 16 is removed from the screen and the other thumbnails slide over to replace the deleted thumbnail 16.

Similarly, if a thumbnail is to be added, the master device may transmit the content item corresponding to the thumbnail as well as a corresponding content ID. For example, if the master device determines to add a new content item corresponding to a thumbnail 17, the master device may transmit the new content item to the other devices, which may insert the new thumbnail into the list and update the list and display accordingly.

Content corresponding to a thumbnail may also be updated over the course of the collaboration. When the master device modifies content, the content and the corresponding content ID are transmitted to the other devices to allow the other devices to update their display accordingly. This may include updating the thumbnail to reflect the changed content or updating the content itself. When adding, deleting, or editing content, each device may handle displaying the change according to their own format.

Alternatively, instead of transmitting content IDs and content when the list is updated, the master device may transmit an entirely new thumbnail list including any changes, and each device may display the updated list accordingly.

While the examples given above involve changes made by the master device, in some embodiments the other devices may also have the ability to update the content and have those changes propagated to the other devices in the real-time collaboration. In this case, the changes can be propagated in a similar manner as described above, except that the device making the changes transmits the appropriate content ID and content instead of the master device.

In addition, the master device may change over the course of the collaboration. For example, referring to the system of FIG. 1, the collaboration may start out with device 1 as the master device. The participants may later agree to switch the master device to device 2, perhaps because the user of device 2 has a particular area of expertise for the topic at hand or because the user of device 1 is dropping out of the conversation. To change the master device, the current master device may transmit a message indicating that the master device is shifting from device 1 to device 2. The display of the other devices, however, may remain the same, as each device's display is independent of the others. Thus, the display shown on device 3 will remain the same despite the change in the master device from device 1 to device 2.

The display schemes shown in FIGS. 2A and 3B are merely exemplary. Other display schemes may also be possible. For example, the thumbnail list may be rendered as a pop-up window. The thumbnail list may be displayed as a vertical list, or as composite screen in which the thumbnail list is displayed on one side of the screen and a larger display of the content corresponding to the thumbnail having the focus is displayed on another. Each device may display the thumbnail list in a scheme appropriate to that device, and update the display in response to a change in focus independently of how the other devices updated their display.

In another embodiment, the display scheme may vary according to an orientation of the device. For example, a tablet displaying the thumbnail list may display the thumbnail list horizontally across the top (or bottom) of the screen while in a portrait mode, and may display the thumbnail list vertically along the left (or right) of the screen while in a landscape mode, with the content corresponding to the thumbnail having the focus displayed in the center of the screen. When the content ID is received from the master device, the thumbnail list is scrolled and the focus changed according to a display format for the current orientation.

In some embodiments, the display screen may be large enough to display all of the thumbnails at once, which may happen with a large display or a small number of thumbnails. In this situation, the display may only be updated to reflect the thumbnail having the focus, for example by changing the highlight on the display.

Figure 3:
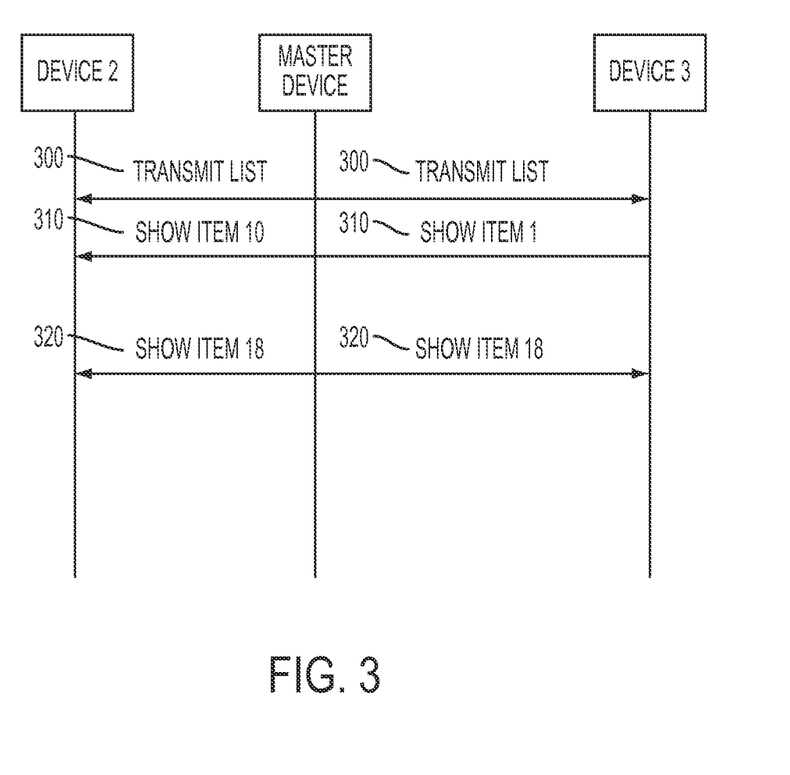
FIG. 3 illustrates a method of displaying content in a real-time collaboration system according to an embodiments of the present disclosure.

FIG. 3 illustrates a method of displaying content according to an exemplary embodiment of the present disclosure.

Referring to FIG. 3, the master device transmits the list of thumbnails to each of the devices 2 and 3 in operation 300. The devices 2 and 3 display the list in a format suitable for each device. The devices do not take into account the display format of any of the other devices, including the master device. If the master device is participating in the collaboration, the master device also displays the list in an appropriate format.

In operation 310, the focus shifts to thumbnail 10. The master device transmits a content ID corresponding to the thumbnail 10 to the devices 2 and 3. The devices 2 and 3 update their displays to shown the focus on thumbnail 10. This may include scrolling the display, popping up a window displaying the thumbnail 10, or, if the thumbnail 10 is already shown, taking no action.

As described above, in some cases the master device may transmit a content ID for a purpose other than changing the focus, such as to identify added, removed, or changed content. The master device may accordingly also transmit an indicator to inform each device of the purpose for transmitting the content ID. If the devices 2 and 3 determine that the focus is not being changed, the devices may instead update the thumbnail list and content according to the instruction from the master device.

In operation 320, the focus shifts again to thumbnail 18. Accordingly, the master device transmits a content ID corresponding to the thumbnail 18 to the devices 2 and 3. Each of the devices 2 and 3 then update their displays to reflect that the focus is now on thumbnail 18. Each device takes whatever action is appropriate for that device, independent of the other devices. For example, the master device may scroll to the thumbnail 18 vertically, while the device 2 may scroll to the thumbnail 18 horizontally. Device 3 may already be displaying thumbnail 18, and so may take no action at all in response to receiving the content ID. Each device updates its display independently of the others, while still showing the same thumbnail as having the focus. In this manner, each user can see the same content in the manner most suited for that user's device. The display of content is synchronized across all devices while the display format is different for each device.

It is also possible for the devices to change the focus on their own. For example, the user of one of the devices may wish to review another slide in a real-time presentation. In this case, the display for that user may change the focus to the other slide, but since this user is not operating the master device, this change in focus will not be reflected in the other devices. In a similar vein, it may be possible for the master device to change a focus without informing the other devices. When the device receives a focus change instruction from the master device, the device may automatically change the focus according to the focus change instruction, request confirmation from the user (e.g., with a dialog box), display a notification to inform the user of the focus change, or take no action.

Figure 4:
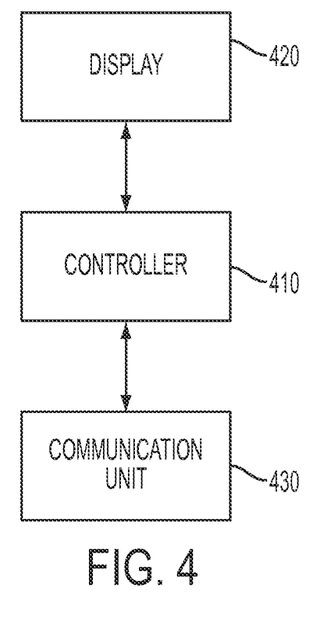
FIG. 4 illustrates a device for real-time collaboration according to an embodiment of the preset disclosure.

FIG. 4 illustrates a device according to an embodiment of the present invention.

Referring to FIG. 4, the device may be any device capable of participating in a real-time collaboration session, such as a mobile phone, Personal Digital Assistant (PDA), tablet, laptop computer, desktop computer, home entertainment device, console, and the like.

The device includes a controller 410, a display 420, and a communication unit 430. The controller 410 controls the overall operations of the device. For example, when the communication unit 430 receives the list of thumbnails from the master device, the control unit 420 controls the display unit 420 to display the list in a format suitable for the device. When the device is acting as the master device, the controller 410 may control the communication unit 430 to transmit the list of thumbnails, the content, and the content ID to the other devices as described above.

The display unit 420 displays the thumbnails in the thumbnail list and the corresponding content on a screen. The display unit 420 may be implemented using any display technology, such as Liquid Crystal Display (LCD), Light Emitting Diode (LED), Organic LED (OLED), Active Matrix OLED (AMOLED), plasma, and the like. Depending on the particular device, the display unit 420 may be integrated into the housing of the device or provided as an external apparatus connected to the device via a cable. The display unit may also include a touchscreen.

The communication unit 420 communicates with the other devices in the real-time collaboration system, as well as any other servers or other devices used to implement the real-time collaboration system. The communication unit 420 may communicate using any wired or wireless protocol, such as Ethernet, Long Term Evolution (LTE), LTE-Advanced (LTE-A), 3G cellular, Wi-Fi, and the like. The communication unit 420 may be configured to include an RF transmitter (not shown) for up-converting the frequency of transmitted signals and amplifying the transmitted signals, and an RF receiver (not shown) for low-noise amplifying of received RF signals and down-converting the frequency of the received RF signals. The communication unit 420 transmits/receives the thumbnail list, the content, and the content ID.

As a wide variety of devices may be employed for real-time collaboration, each device may have a number of additional components besides those shown in FIG. 4. These additional components are omitted from FIG. 4 in order to provide greater clarity. The additional components may include, but are not limited to, an input unit (including a gamepad, keyboard, mouse, touchpad, etc.); a Global Positioning System (GPS) unit; one or more cameras; one or more speakers; one or more microphones; sensors (e.g. an accelerometer, temperature sensor, etc.); a short range communication unit (e.g., Bluetooth, Near Field Communication (NFC), etc.); a storage unit (e.g., a hard disk drive, solid state drive, flash memory, Read Only Memory (ROM), Random Access Memory (RAM), etc.); and the like. The additional components may vary according to a design and function of the additional device.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for synchronizing the display of content in a real-time collaboration system, the method comprising:
   transmitting, from a master device to each of a plurality of other devices, a list of thumbnails and content corresponding to each of the thumbnails;
   for each of the plurality of other devices, displaying the list of thumbnails in a display format that is appropriate for that device, without taking into account a display format of any other device among the plurality of other devices;
   transmitting, from the master device to each of the plurality of other devices, a content ID corresponding to a current focus; and
   for each of the plurality of other devices, scrolling through the list of thumbnails to display the content of the thumbnail corresponding to the received content ID in the display format that is appropriate for that device.

2. The method of claim 1, wherein the scrolling through the list of thumbnails comprises:
   scrolling through the list of thumbnails arranged in a vertical format.

3. The method of claim 1, wherein the scrolling through the list of thumbnails comprises:
   scrolling through the list of thumbnails arranged in a horizontal format.

4. The method of claim 1, further comprising:
   receiving, by each of the plurality of other devices, an updated content ID corresponding to a changed content; and
   displaying, by each of the plurality of other devices, an updated list of thumbnails corresponding to the updated content ID.

5. A real-time collaborative system, the system comprising:
- a master device; and
- a plurality of other devices,
- wherein the master device is configured to:
  - transmit, to each of the plurality of other devices, a list of thumbnails and content corresponding to each thumbnail in the thumbnail list, and
  - transmit a content ID corresponding to a thumbnail corresponding to a current focus, and
- wherein each of the plurality of the other devices is configured to display the list of thumbnails in a format that is appropriate for that device, without taking into account a display format of any other device among the plurality of other devices, and
- wherein, when the content ID is received by each of the plurality of other devices, each of the plurality of other devices scrolls through the list of the thumbnails, and displays the thumbnail corresponding to the content ID, in the display format that is appropriate for that device.

6. A method of displaying content in a real-time collaborative system, the method comprising:
- receiving, at a device, a list of thumbnails and content corresponding to each of the thumbnails;
- displaying the list of thumbnails in a display format that is appropriate for the device, without taking into account a display format of any other device among the plurality of other devices;
- receiving a content ID from a master device corresponding to a thumbnail to which a focus is to be changed; and
- displaying the content of the thumbnail corresponding to the content ID in the display format that is appropriate for the device.

7. The method of claim 6,
- wherein the displaying of the list of thumbnails comprises displaying the list of thumbnails in a vertical arrangement, and
- wherein the displaying of the thumbnail corresponding to the content ID comprises scrolling the list of thumbnails vertically so as to display the thumbnail corresponding to the content ID.

8. The method of claim 6,
- wherein the displaying of the list of thumbnails comprises displaying the list of thumbnails in a horizontal arrangement, and
- wherein the displaying of the thumbnail corresponding to the content ID comprises scrolling the list of thumbnails horizontally so as to display the thumbnail corresponding to the content ID.

9. The method of claim 6, further comprising:
- receiving, by the device, an updated content ID corresponding to content to be updated and an instruction to update the list of thumbnails, and
- updating the display of the thumbnail list based on the content to the updated and the update instruction.

10. An apparatus for real-time collaboration, the apparatus comprising:
- a communication device configured to receive:
  - a list of thumbnails and content corresponding to each of the thumbnails, and
  - a content ID corresponding to a thumbnail to which a focus is to be changed;
- a display; and
- at least one processor configured to:
  - control the display to display the list of thumbnails on the display in a format that is appropriate for the display, without taking into account a display format of any other device, and
  - when the content ID is received, control the display to display the content of the thumbnail corresponding to the content ID, in the format that is appropriate for the device.

11. The apparatus of claim 10, wherein the at least one processor is further configured to control the display to
- display the list of thumbnails in a horizontal arrangement, and
- display the thumbnail corresponding to the content ID by scrolling the list of thumbnails horizontally so as to display the thumbnail corresponding to the content ID.

12. The apparatus of claim 10, wherein the at least one processor is further configured to control the display to:
- display the list of thumbnails in a vertical arrangement, and
- display the thumbnail corresponding to the content ID by scrolling the list of thumbnails vertically so as to display the thumbnail corresponding to the content ID.

13. The apparatus of claim 10, wherein, when the communication device receives an updated content ID corresponding to content to be updated and an instruction to update the list of thumbnails, the at least one processor is further configured to control the display to update the displayed list of thumbnails according to the update instruction.

* * * * *